Patented Jan. 18, 1944

2,339,260

UNITED STATES PATENT OFFICE 2,339,260

VITREOUS ENAMELING

Leon J. Frost and Charles H. Commons, Jr., Niagara Falls, N. Y., assignors to The Titanium Alloy Manufacturing Company, New York, N. Y., a corporation of Maine No Drawing. Application March 11, 1942, Serial No. 434,292

9 Claims. (Cl. 106—48)

This invention relates to frit compositions for use in preparing vitreous enamels. This application is a continuation-in-part of our copending application Serial No. 292,874, filed August 31, 1939.

In recent years, an important development in the field of vitreous enameling has been with reference to enamel compositions containing zircon zirconium silicate, zirconium oxide or other zirconium compounds in the raw frit batch. An important advantage of the use of such zirconium compounds in enamels is that enamels containing them do not require the presence of antimony or other poisonous compounds to secure the required opacity. These enameling frit compositions, particularly when opacified with zirconium oxide and milled to form suitable slips, and fired on a suitable base, form enamels of high opacity. However, among other problems connected with the preparation of such frits is that of acid resistance, particularly when used for such purposes as kitchen ware, hospital utensils and the like.

In accordance with this invention, a raw frit composition is provided which contains zircon or other zirconium compound and a small amount of the lithium containing mineral amblygonite. This frit composition is smelted, and then milled with an opacifier and other ingredients in customary fashion to form a slip, which is then applied to a suitable surface and fired to form an enamel.

Amblygonite is a complex fluoride-phosphate of lithium and aluminum. This mineral contains about 80 per cent $Al_2O_3$ plus $P_2O_5$, with 5 to 9 per cent $Li_2O$ and most of the remainder fluorine, with minor amounts of impurities. By some it has been designated as a material containing aluminum phosphate, and when the term "aluminum phosphate" is mentioned in the claims, it is understood that amblygonite is included. At any rate, its use in enamels is highly advantageous as a relatively cheap source of lithium, and in addition furnishes fluorine, phosphorus and aluminum, which are desired enamel ingredients, at least in small amounts. Lithium compounds in enamels act as fluxes, and in this respect are much powerful than compounds of the other alkali metals such as sodium and potassium. Thus 0.2% of lithium is about as effective as 1% of sodium. In addition, lithium compounds have a less deleterious effect upon the acid resistance of enamels in which they are incorporated than the corresponding compounds of sodium and potassium. The net result is that enamels in which lithium replaces an equivalent part of the sodium or potassium employed as fluxes exhibit improved acid resistance.

The amount of amblygonite to be used is generally quite small, a convenient quantity being about 2 per cent. The advantages gained by incorporating amblygonite generally decrease as the quantity is increased too much, principally because of the increased amount of $P_2O_5$ in the enamel. In general it has been found that amounts above 6 per cent are not desirable, and that amounts below about ¼ to ½ of 1 per cent are not sufficiently effective. The preferred amount is about 1½ to 2½ per cent.

Amblygonite in this respect seems to have a superior effect to that of other lithium containing minerals, such as lepidolite and spodumene, or lithium compounds such as lithium carbonate. This is true even when the formula is adjusted so as to contain the same amount of lithium, phosphate, aluminum and fluorine as is contained in amblygonite.

As stated above, in accordance with the present invention amblygonite is incorporated in frit compositions containing zirconium compounds. Of the available zirconium compounds, zircon or zirconium silicate is the most suitable from the standpoint of cost and availability. The important thing, of course, is that the final frit should contain a certain amount of zirconium oxide, since zirconium silicate and other zirconium compounds apparently decompose during the process of smelting to form zirconium oxide, which in turn may recombine with other frit constituents. Zirconium oxide itself may be used, but is generally not preferred on account of cost. Certain so-called double zirconium silicates, such as calcium zirconium silicate, magnesium zirconium silicate, zinc zirconium silicate and others, as described in U. S. Patent No. 2,127,844, present certain advantages when used in certain frit formulas. Modern zirconium containing frits generally contain from about 4 to 15 per cent $ZrO_2$ and preferably 6 to 12 per cent $ZrO_2$. If zircon is used this would mean about 5 to 22.5 per cent zircon, or preferably 9 to 18 per cent zircon. The present invention may thus be used not only with enamels of the type described in our copending application Serial No. 292,874 of which this is a continuation-in-part, but also in other types of zirconium-containing enamels.

The invention having been described generally, the following examples are given of specific modes of practicing the same:

EXAMPLE 1

The following ingredients (given in parts by weight) were mixed together and smelted at a temperature just below 2200° F. until a melt forming smooth strings results.

| | |
|---|---|
| Dehydrated borax | 23.12 |
| Pyrophyllite | 38.46 |
| Zircon | 15.38 |
| Fluorspar | 6.00 |
| Zinc oxide | 2.78 |
| Amblygonite | 2.00 |
| Sodium silicofluoride | 12.03 |
| Sodium nitrate | 2.50 |
| Aluminum hydrate | 2.90 |

100 parts of this frit were milled with 8 parts of enameler's clay, 6 parts of zirconium oxide opacifier, 1 part of zinc oxide, ¼ part of sodium fluoride and about 40 parts of water to 4 grams residue per 100 cc. of slip on a 200 mesh sieve. The slip thus formed may be applied by dipping or spraying to sheet iron, previously supplied with a ground coat, at any suitable rate in one or two coats, according to standard practice in the enameling industry. After firing for 2½ minutes at 1520° F., the surface is highly lustrous and of a good cream white color.

EXAMPLE 2

The following ingredients (given in parts by weight) were mixed together and smelted at a temperature of about 2100° F. until a melt forming smooth strings results.

| | |
|---|---|
| Dehydrated borax | 26.00 |
| Pyrophyllite | 39.45 |
| Zircon | 10.00 |
| Sodium nitrate | 2.74 |
| Fluorspar | 6.00 |
| Aluminum hydrate | 2.97 |
| Amblygonite | 2.00 |
| Zinc zirconium silicate | 3.28 |
| Sodium silicofluoride | 12.00 |

100 parts of this frit were milled with 5 parts of enameler's clay, 6 parts of zirconium oxide opacifier, 0.1 part of sodium nitrite and about 40 parts of water to 3 grams residue per 100 cc. of slip on a 200 mesh sieve. The slip thus formed may be applied as in Example 1. After firing for 2½ minutes at 1500° F. the opacity, gloss and surface are excellent.

EXAMPLE 3

The following ingredients (given in parts by weight) were mixed together and smelted at 2100° F. until a melt forming smooth strings results.

| | |
|---|---|
| Borax | 37.55 |
| Quartz | 32.74 |
| Soda-ash | 3.79 |
| Sodium nitrate | 2.50 |
| Cryolite | 13.77 |
| Fluorspar | 5.17 |
| Pyrophyllite | 14.28 |
| Zircon | 10.78 |
| Amblygonite | 3.00 |

100 parts of this frit were milled with 7 parts of enameler's clay, 10 parts of zirconium oxide opacifier, ¼ part of $MgCO_3$ and about 40 parts of water to 12 grams residue per 100 cc. of slip on a 200 mesh sieve.

EXAMPLES 4–11

The following examples were prepared by mixing the raw ingredients as shown by the table below, and smelting at a temperature of 2000° to 2100° F. until a melt forming smooth strings results.

TABLE

*Parts by weight*

| | Examples | | | |
|---|---|---|---|---|
| | 4 | 5 | 6 | 7 |
| Dehydrated borax | 224.5 | 221.7 | 136.3 | 219.7 |
| Sodium fluosilicate | 116.9 | 115.3 | 109.3 | 114.3 |
| Fluorspar | 58.3 | 57.5 | 54.4 | 57.0 |
| Zinc oxide | | | 25.2 | 26.4 |
| Amblygonite | 19.4 | 19.2 | 18.1 | 19.0 |
| Sodium nitrate | 24.3 | 24.0 | 22.7 | 23.8 |
| Zircon | 86.0 | 63.5 | | 146.2 |
| Pyrophyllite | | | | 366.0 |
| Aluminum hydrate | | | | 27.8 |
| Zinc zirconium silicate | 88.5 | | | |
| Special opacifier [1] | | | 161.1 | |
| Quartz powder | 217.4 | 182.0 | 121.4 | |
| Boric acid | | | 90.2 | |
| Zirconium spinel | | 136.8 | | |
| Sillimanite | 164.6 | | | |
| Andalusite | | 180.0 | | |
| English china clay | | | 261.3 | |

| | Examples | | | |
|---|---|---|---|---|
| | 8 | 9 | 10 | 11 |
| Dehydrated borax | 219.7 | 134.6 | 221.0 | 222.3 |
| Sodium fluosilicate | 114.3 | 109.6 | 114.9 | 115.7 |
| Fluorspar | 57.0 | 54.6 | 57.3 | 57.7 |
| Zinc oxide | | 25.3 | 26.5 | |
| Amblygonite | 19.0 | 18.2 | 19.1 | 19.2 |
| Sodium nitrate | 23.8 | 22.8 | 23.9 | 24.1 |
| Zircon | 86.1 | | | 63.6 |
| Pyrophyllite | 366.0 | 350.7 | 440.1 | 334.5 |
| Aluminum hydrate | 27.8 | 26.6 | 1.7 | |
| Zinc zirconium silicate | 86.5 | | | |
| Special opacifier [1] | | 164.5 | | |
| Zirconium oxide | | | 95.5 | |
| Quartz powder | | | | 25.8 |
| Boric acid | | 93.1 | | |
| Zirconium spinel | | | | 137.1 |

[1] This product is a zirconium opacifier produced in accordance with U. S. Patent No. 1,789,311.

100 parts of each of these frits were each milled with 6 parts of enameler's clay, 6 parts of zirconium oxide, 0.1 part of $NaNO_2$, and 38 parts of water to a fineness of +200 mesh. The slip thus formed was applied by spraying to sheet iron, previously supplied with a ground coat, at the rate of 72 grams per sq. ft. for two coats. After firing at 1500° F. for 2½ to 4 minutes, the surfaces are highly lustrous and of a good cream white color.

EXAMPLE 12

The following ingredients (given in parts by weight) were mixed together and smelted at 2150 to 2200° F. until a melt forming smooth strings results.

| | |
|---|---|
| Dehydrated borax | 18.78 |
| Fluorspar | 6.00 |
| Calcium carbonate | 14.26 |
| Titanium dioxide | 4.00 |
| Zircon | 10.76 |
| Sodium nitrate | 5.00 |
| Sodium silicofluoride | 12.00 |
| Soda ash | 5.86 |
| Amblygonite | 2.00 |
| Quartz | 42.55 |

100 parts of this frit were milled with 5 parts of enameler's clay, 6 parts of zirconium oxide opacifier, 0.1 part of sodium nitrite and about 40 parts of water to 1 gram residue per 100 cc. of slip on a 200 mesh sieve. Although the opacity was not very high, the acid resistance was very good.

EXAMPLE 13

The following ingredients (given in parts by weight) were mixed together and smelted at 2100° F. until a melt forming smooth strings results.

| | |
|---|---|
| Dehydrated borax | 14.45 |
| Calcium carbonate | 14.93 |
| Titanium dioxide | 7.32 |
| Zircon | 9.85 |
| Sodium nitrate | 5.00 |
| Sodium silicofluoride | 12.00 |
| Soda ash | 10.30 |
| Quartz | 38.43 |
| Amblygonite | 1.84 |

100 parts of this frit were milled with 6 or 7 parts of Tennessee ball clay, 10 parts of a complex opacifier being a mechanical mixture of 35% $ZrO_2$, 40% $TiO_2$ and 25% zinc zirconium silicate, and about 40 parts of water, to a fineness such that the entire slip passed through a 200 mesh sieve. A small amount of sodium nitrite may be added if necessary. The slip was applied and fired as in any of the preceding examples.

EXAMPLE 14

The following ingredients (parts by weight) were mixed together and smelted in customary fashion at a temperature of 2050°–2100° F.

| | |
|---|---|
| Dehydrated borax | 17.67 |
| Quartz | 36.80 |
| Soda ash | 5.30 |
| Sodium silicofluoride | 11.28 |
| Calcium fluoride | 5.64 |
| Titanium oxide | 4.70 |
| Amblygonite | 1.88 |
| Sodium nitrate | 5.00 |
| Calcium carbonate | 8.39 |
| Calcium zirconium silicate | 12.62 |

The frit thus formed was quenched in water, and mixed with 7 parts of enameler's clay, ¼ part of anhydrous sodium sulfate, ⅛ part of bentonite, 44 parts of water and 10 parts of the same opacifier as in Example 13, per 100 parts by weight of frit. This mixture was milled to a fineness of less than 1 gram residue on a 200 mesh sieve. When sprayed on a panel and fired for 2½ minutes at 1520° F., this enamel showed a reflectance of 76.7, as measured by the Hunter reflectometer, at an application rate of 72.0 grams per sq. ft.

EXAMPLE 15

The following ingredients (parts by weight) were mixed together and smelted in customary fashion at 2050°–2100° F.

| | |
|---|---|
| Dehydrated borax | 10.14 |
| Quartz | 33.02 |
| Soda ash | 13.90 |
| Sodium silicofluoride | 6.47 |
| Calcium fluoride | 10.28 |
| Titanium oxide | 6.54 |
| Amblygonite | 2.45 |
| Sodium nitrate | 5.00 |
| Zircon | 16.12 |
| Topaz | 5.00 |

The frit thus formed was milled with the mill mixture and the slip fired on a panel as in Example 14. The enamel showed a reflectance of 70.8 at an application rate of 40.2 grams per sq. ft.

EXAMPLE 16

The following ingredients (parts by weight) were mixed together and smelted in customary fashion at 2050°–2100° F.

| | |
|---|---|
| Dehydrated borax | 10.70 |
| Quartz | 37.13 |
| Soda ash | 12.06 |
| Sodium nitrate | 4.93 |
| Zircon | 17.00 |
| Zinc oxide | 1.48 |
| Titanium oxide | 6.90 |
| Sodium silicofluoride | 15.47 |
| Amblygonite | 2.59 |

The frit thus formed was milled with the mill mixture and the slip fired on a panel as in Example 14.

EXAMPLE 17

The following ingredients (given in parts by weight) were mixed together and smelted at 2150° F. until a melt forming smooth strings results.

| | |
|---|---|
| Dehydrated borax | 15.90 |
| Sodium nitrate | 5.00 |
| Calcium carbonate | 5.36 |
| Zircon | 7.70 |
| Titanium dioxide | 8.00 |
| Sodium silicofluoride | 8.00 |
| Amblygonite | 2.00 |
| Quartz | 43.09 |
| Soda ash | 18.20 |

100 parts of this frit were milled with 6 parts of enameler's clay, 10 parts of the opacifier employed in Example 13, 0.1 part of sodium nitrite and about 40 parts of water until the entire slip passed through a 200 mesh sieve. Although the opacity was only moderately good, the acid resistance was very good.

The following example illustrates the application of this invention to dry process enameling.

EXAMPLE 18

The following ingredients (parts by weight) were mixed and smelted together at a temperature of 1900° F. until a melt forming smooth strings results.

| | |
|---|---|
| Dehydrated borax | 28.85 |
| Pyrophyllite | 40.00 |
| Zircon | 12.22 |
| Sodium nitrate | 3.50 |
| Fluorspar | 5.50 |
| Cryolite | 16.00 |
| Amblygonite | 2.00 |
| Soda ash | 2.29 |

100 parts of this frit were milled dry with 2 parts of zirconium oxide opacifier to a fineness of about 90% through a 200 mesh sieve. The milled mixture was dredged onto cast iron pieces and fired at 1550° F. for 1 minute. The enamel was a good white in color, of good opacity and luster.

In the above description and examples, when parts and percentages are mentioned, parts and percentages by weight are understood.

As many variations are possible within the scope of this invention, it is not intended to be limited except as defined by the appended claims.

We claim:

1. The process of producing an enamel frit which comprises adding to the glass forming materials of the raw batch zirconium silicate and aluminum phosphate in such proportions that the mixture contains from 7 to 15 per cent zirconium silicate and from 0.25 to 4 per cent aluminum phosphate.

2. A frit composition for forming vitreous enamels, containing ½ to 6 per cent amblygonite, together with a zirconium compound in such proportion that the frit contains 4 to 15 per cent zirconium oxide.

3. A frit composition for forming vitreous enamels, containing 1½ to 2½ per cent amblygonite, together with a zirconium compound in such proportion that the frit contains 4 to 15 per cent zirconium oxide.

4. A frit composition for forming vitreous enamels, containing 1½ to 2½ per cent amblygonite, together with a zirconium compound in such proportion that the frit contains 6 to 12 per cent zirconium oxide.

5. A frit composition for forming vitreous enamels, containing ½ to 6 per cent amblygonite, together with zircon in such proportion that the frit contains 4 to 15 per cent zirconium oxide.

6. A frit composition for forming vitreous enamels, containing 1½ to 2½ per cent amblygonite, together with zircon in such proportion that the frit contains 4 to 15 per cent zirconium oxide.

7. A frit composition for forming vitreous enamels, containing 1½ to 2½ per cent amblygonite, together with zircon in such proportion that the frit contains 6 to 12 per cent zirconium oxide.

8. A frit composition for forming vitreous enamels, containing ½ to 6 per cent amblygonite, together with a zirconium compound in such proportion that the frit contains 6 to 12 per cent zirconium oxide.

9. A frit composition for forming vitreous enamels, containing ½ to 6 per cent amblygonite, together with zircon in such proportion that the frit contains 6 to 12 per cent zirconium oxide.

LEON J. FROST.
CHARLES H. COMMONS, Jr.

CERTIFICATE OF CORRECTION.

Patent No. 2,339,260.                                January 18, 1944.

LEON J. FROST, ET AL.

It is hereby certified that error appears in the printed specification of the above numbered patent requiring correction as follows: Page 1, first column, line 9, for "zirconium silicate" read --(zirconium silicate)--; line 49, after "much" insert --more--; and that the said Letters Patent should be read with this correction therein that the same may conform to the record of the case in the Patent Office.

Signed and sealed this 14th day of March, A. D. 1944.

Leslie Frazer (Seal)                              Acting Commissioner of Patents.